No. 708,708. Patented Sept. 9, 1902.
A. W. HARRISON.
ELECTRODE SEPARATOR FOR BATTERIES.
(Application filed May 7, 1902.)
(No Model.)
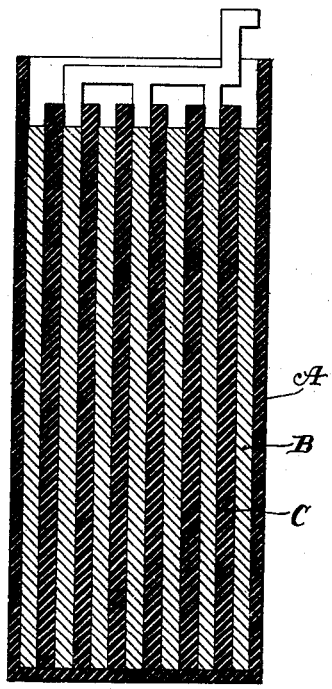
WITNESSES
Chas. L. Hyde.
M. C. Nickelson.
INVENTOR
Arthur W. Harrison
BY Hazard & Harpham
ATTORNEYS.

UNITED STATES PATENT OFFICE.

ARTHUR W. HARRISON, OF LOS ANGELES, CALIFORNIA, ASSIGNOR OF TWO-THIRDS TO F. A. MARCHER, OF LOS ANGELES, CALIFORNIA.

ELECTRODE-SEPARATOR FOR BATTERIES.

SPECIFICATION forming part of Letters Patent No. 708,708, dated September 9, 1902.

Application filed May 7, 1902. Serial No. 106,360. (No model.)

*To all whom it may concern:*

Be it known that I, ARTHUR W. HARRISON, a citizen of the United States, residing at Los Angeles, in the county of Los Angeles and State of California, have invented new and useful Improvements in Electrode-Separators for Electric Batteries, of which the following is a specification.

My invention relates to batteries having a plurality of electrodes which are separated from each other by a separator of non-conducting substance interposed between the electrodes; and the object thereof is to provide a very light and efficient separator which will prevent short circuits and will lessen the weight of the battery. I accomplish this object by the plate-separator described herein and illustrated in the accompanying drawing, which is a vertical section of a battery-cell provided with my improved plate-separators.

In storage batteries designed for use in automobiles it is especially desirable that the battery shall be as light as possible without diminishing its efficiency and that the electrodes shall be kept perfectly insulated from each other. For this purpose perforated corrugated sheet-rubber has been extensively used; but such material is expensive and is liable to break. Corrugated sheets of wood have also been used; but such material has considerable weight, is also very liable to break in handling, and it increases the resistance of the cells.

I have discovered that a plate-separator may be made from yucca, preferably *Yucca brevifolia*, if the starch and non-fibrous material be first extracted without destroying the fiber. The tree is cut in the desired lengths and is separated into layers of the desired thickness, which are then treated by either an acid or an alkaline process to remove the starch and other non-fibrous portions. I have found in practice that a very convenient method is to boil the raw yucca cut to the desired size in a weak solution of sulfuric acid or caustic soda until the starch and other non-fibrous material is dissolved. It is then taken out of the liquid and dried, when it is ready for use. In the drawing, A is the battery-casing, of non-conducting material, which contains the electrodes B, separated by strips of yucca C, with the non-fibrous material removed. By the use of yucca prepared as above set forth a very tough and exceedingly light non-conducting electrode-separator is produced which permits of very free circulation of the fluid around the electrodes and at the same time perfectly insulates them from each other and prevents the formation of short circuits. If the non-fibrous material is not removed from the yucca, it clogs the circulation and interferes with the action of the battery.

Having described my invention, what I claim as new, and desire to secure by Letters Patent, is—

1. In a battery an electrode-separator composed of yucca having the non-fibrous portion thereof removed.

2. In a battery an electrode-separator therefor composed of the fibrous portion of yucca.

3. As a new article of manufacture a battery electrode-separator of yucca deprived of the non-fibrous portions thereof.

In witness that I claim the foregoing I have hereunto subscribed my name this 25th day of April, 1902.

ARTHUR W. HARRISON.

Witnesses:
G. E. HARPHAM,
HENRY T. HAZARD.